(12) United States Patent
Gerdes

(10) Patent No.: US 8,746,298 B2
(45) Date of Patent: Jun. 10, 2014

(54) CAP-FREE NECK END FOR A FILLER NECK

(75) Inventor: Ralf Gerdes, Köln (DE)

(73) Assignee: Gerdes GmbH, Kerpen (DE)

(*) Notice: Subject to any disclaimer, the term of this patent is extended or adjusted under 35 U.S.C. 154(b) by 1378 days.

(21) Appl. No.: 11/885,446

(22) PCT Filed: Feb. 10, 2006

(86) PCT No.: PCT/EP2006/050864
§ 371 (c)(1),
(2), (4) Date: Aug. 29, 2007

(87) PCT Pub. No.: WO2006/084908
PCT Pub. Date: Aug. 17, 2006

(65) Prior Publication Data
US 2008/0271816 A1 Nov. 6, 2008

(30) Foreign Application Priority Data

Feb. 10, 2005 (DE) .................. 20 2005 002 223 U
Nov. 12, 2005 (EP) .................................. 05110674

(51) Int. Cl.
*B65B 1/04* (2006.01)
(52) U.S. Cl.
USPC .......... 141/350; 141/367; 141/349; 220/86.2; 220/203.24
(58) Field of Classification Search
USPC ............... 141/350, 367, 349; 220/86.1–86.3, 220/203.24, 203.26, 203.28; 251/149.2
See application file for complete search history.

(56) References Cited

U.S. PATENT DOCUMENTS

| 2,206,948 A | 7/1940 | Frankford |
| 3,845,877 A | 11/1974 | Arnett et al. |
| 4,265,752 A | 5/1981 | O'Banion |
| 4,715,509 A | 12/1987 | Ito et al. |
| 5,465,861 A | 11/1995 | Kunz et al. |

(Continued)

FOREIGN PATENT DOCUMENTS

| AT | 009 752 U1 | 3/2008 |
| BE | 1016911 A5 | 9/2007 |

(Continued)

*Primary Examiner* — Jason J Boeckmann
*Assistant Examiner* — Joel Zhou
(74) *Attorney, Agent, or Firm* — Novak Druce Connolly Bove + Quigg LLP

(57) ABSTRACT

A cap-free closeable neck end for a filler neck of a tank of a motor vehicle, the cap-free closeable neck including an upper entry space forming an insertion region for a fuel nozzle and being surrounded by a side wall, a lower sealing flap arranged in the upper entry space and a closing mechanism arranged above the lower sealing flap. The closing mechanism includes an upper filling opening and an upper cover, which in a closed state at least partially covers the upper filling opening and being embodied in such a manner that the upper cover is displaced by inserting an outlet pipe of a fuel nozzle into the upper entry space for releasing the upper filling opening so as to allow for the insertion of the outlet pipe through the upper filling opening and the lower sealing flap. When used for forming a protection against a filling with unsuitable fuel, the upper cover, in its closed state, is blocked by a locking element and wherein the locking element is embodied in such a manner that it is unlocked as a function of a type-specific shape of the outlet pipe of the fuel nozzle, only when the tank is filled with suitable fuel.

36 Claims, 3 Drawing Sheets

(56) References Cited

U.S. PATENT DOCUMENTS

| | | | |
|---|---|---|---|
| 5,884,958 A | 3/1999 | Oddenino | |
| 6,279,626 B1* | 8/2001 | Schmitt et al. | 141/348 |
| 6,508,275 B1 | 1/2003 | Sadr et al. | |
| 6,755,057 B2* | 6/2004 | Foltz | 70/159 |
| 6,994,130 B1* | 2/2006 | Gabbey et al. | 141/371 |
| 8,047,393 B2 | 11/2011 | Feichtinger | |
| 8,100,155 B2 | 1/2012 | Bar et al. | |
| 2002/0020465 A1* | 2/2002 | Gzik | 141/390 |
| 2004/0163732 A1* | 8/2004 | Gramss et al. | 141/350 |
| 2006/0060581 A1* | 3/2006 | Foltz et al. | 220/265 |
| 2009/0001077 A1 | 1/2009 | Feichtenger | |
| 2009/0194198 A1* | 8/2009 | Bar et al. | 141/349 |

FOREIGN PATENT DOCUMENTS

| | | | | |
|---|---|---|---|---|
| DE | 9752 | | 11/1902 | |
| DE | 32 23 991 C1 | | 10/1983 | |
| DE | EP1262355 | * | 12/2002 | B60K 15/04 |
| DE | 203 09 799.8 U1 | | 9/2004 | |
| DE | 20309799 | * | 9/2004 | B60K 15/04 |
| DE | 20 2005 012 620 U1 | | 1/2005 | |
| DE | 10 2005 047 459 A1 | | 8/2006 | |
| EP | 0 602 440 A1 | | 6/1994 | |
| EP | 1 086 842 A2 | | 3/2001 | |
| EP | 1 262 355 A1 | | 12/2002 | |
| EP | 1 319 545 A1 | | 6/2003 | |
| EP | 1319545 | * | 6/2003 | B60K 15/04 |
| EP | 1 086 842 A3 | | 9/2003 | |
| EP | 1 086 842 B1 | | 3/2006 | |
| FR | 2 753 139 A1 | | 3/1998 | |
| FR | 2 905 638 A1 | | 3/2008 | |
| GB | 2 424 870 A | | 11/2006 | |
| WO | WO 01/68397 A1 | | 9/2001 | |
| WO | WO 2006/079915 A1 | | 8/2006 | |
| WO | WO 2006/079917 A1 | | 8/2006 | |

* cited by examiner

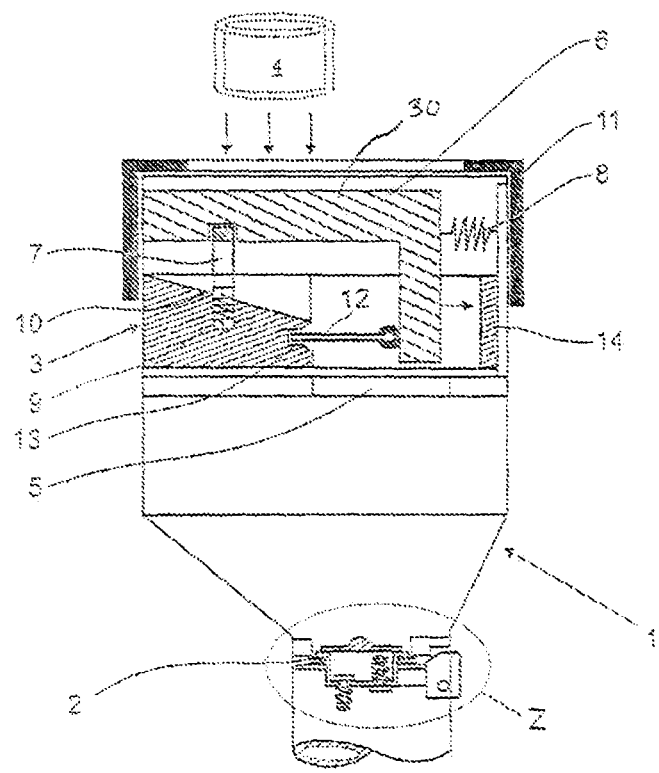
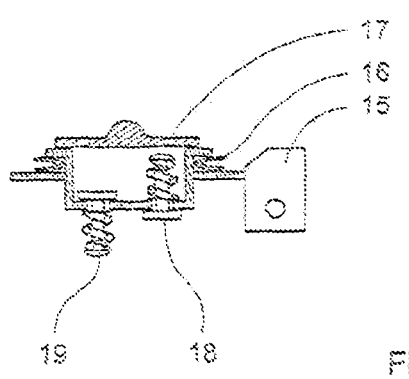
Fig.1
Fig.2

CAP-FREE NECK END FOR A FILLER NECK

The present application is a national filing under 35 U.S.C. §371 based on Patent Cooperation Treaty patent application Ser. No. PCT/EP2006/050864, filed on Feb. 10, 2006, the entire contents of which is incorporated herein by reference.

Applicant claims, under 35 U.S.C. §119, the benefit of priority of 1) the filing date of Feb. 10, 2005 of a German patent application, copy attached, Ser. No. 20 2005 002 223.3, filed on the aforementioned date, and 2) the filing date of Nov. 12, 2005 of a European patent application, copy attached, Ser. No. 05110674.8, filed on the aforementioned date, the entire contents of each of which are incorporated herein by reference.

BACKGROUND OF THE INVENTION

1. Field of the Invention

The present invention relates to a neck end for a filler neck of a tank of a motor vehicle, in particular a neck end which can be closed without a cap having an entry space, which is particularly but not necessarily designed as a pipe section having a funnel or pipe-like wall, wherein the entry space can have a continuous or changing cross section of any shape. In the following, the entry space will be identified in this description as a pipe section, without this being associated with a limitation to a certain geometry.

2. Description of the Related Art

In the pipe section, the neck end has a lower sealing flap and, above the lower sealing flap, a closing mechanism, which has an upper filling opening and at least one upper cover, which at least partially covers the upper filling opening in its closed state. The closing mechanism is thereby embodied in such a manner that the upper cover is displaced by inserting an outlet pipe of a fuel nozzle into the pipe section for releasing the upper filling opening so as to allow for the insertion of the outlet pipe through the upper filling opening and the lower sealing flap. Almost throughout the world, the fuel nozzles thereby have a different pipe diameter for diesel fuels and gasoline.

Neck ends of this type are known from DE 203 09 799.8 U1. In this neck end, the neck is closed via two flaps, which are arranged on top of one another in the neck and which are held against a sealing surface by the force of, in each case, a closing spring. The two caps are pressed downward by inserting the outlet pipe of a fuel nozzle or of a spout of a jerry can, thus resulting in a continuous opening.

Even though these closures provide for a good seal, even without an additional tank cap, it would still be desired if they could be further improved and if they additionally had a protection against improper fueling. Particularly in the case of modern engines, it is increasingly important to keep in mind safe fuel grades due to the fact that, for example, modern injection systems of a common-rail diesel injection are lubricated via the lubricant content of the diesel fuel and can sustain heavy damages after being operated with a gasoline for only a short operating time.

SUMMARY AND OBJECTS OF THE INVENTION

It is thus an object of the present invention to create a neck end, which can be produced as simply as possible and which offers to minimize the danger or an improper fueling, by using a closure, which is as safe as possible.

According to the present invention, this object is solved in that, for the purpose of creating a protection against a filling with unsuitable fuel, the upper cover in its closed state is blocked by at least one locking element and in that the locking element is embodied in such a manner that it can be unlocked as a function of the shape of the outlet pipe of the fuel nozzle, only in response to a fueling with suitable fuel.

Even though the present invention does not yet make every improper fueling impossible, the risk, however, is clearly minimized. It is common throughout the world that lead free gasoline is pumped by fuel nozzles, which have a smaller diameter of the lower end of the outlet pipe than diesel fuels. This fact can thus be used according to the present invention for avoiding an unlocking of the neck end in the event that the incorrect fuel nozzle is used and it is as least possible to prevent a fueling of a vehicle comprising a diesel engine with gasoline.

Provided that the petroleum trade is to use further fuel nozzle models in the future, a further increase of the error protection will obviously become possible. In an ideal case, each attempt of an improper fueling can already be prevented if a type-specific diameter of the outlet pipe is used, which does not only contribute to the prevention of unnecessary repair costs, but also to the relief of impacts on the environment, in that deficiencies must then no longer be disposed of. Car rental companies can then also trust that the vehicles are no longer deliberately or carelessly fueled with unsuitable fuel, so as to save costs when the cars are being returned, for example, or because the driver is not able to speak the respective language of the country and reaches for the wrong fuel nozzle out of ignorance.

When the term "cap-free" is used in the context of this application, this does obviously not refer to the fact that the filler neck does not have an internal cap. Instead, what is meant here is that it is no longer necessary to use a conventional tank cap in the traditional sense, but that one could possibly be used for safety reasons. In the context of this application, the term "pipe section" is to describe the inflow region of the neck, which obviously does not need to have a cylindrical cross section, but can have any cross section, which is either constant or which changes across the depth of the neck. Furthermore, the range of application of the present invention is not to be limited to the tank cap, even though the application will be described below as the preferred use. On principle, a use is possible for all storage tanks inside and outside of vehicle technology, in the context of the motor vehicle in particular also in the region of the filler neck for the engine or transmission oil.

The neck end of the present invention is affected by the possibility of locking the upper filling opening and to be able to override this locking only if the "correct" fuel nozzle is used. This can occur in manifold ways. One possibility is, for example, that the fuel nozzle pushes two clamping jaws, which are located opposite one another, sidewards, said clamping jaws, in turn, locking a pivot plate, which covers or closes the upper filling opening from below. The following cases are possible with the fueling systems, which are presently most frequently used:

1. When attempting to wrongly fuel diesel fuel into a vehicle with an Otto engine, the fuel nozzle of the diesel filling pump will have a larger diameter than the "expected" fuel nozzle of the filling pump for gasoline. In this case, the fuel nozzle is too large to be inserted into the area of operation of the filler neck; it can thus not push the clamping jaws outwards and the operator will recognize the error in that the upper cover cannot be opened and the fuel nozzle cannot be inserted into the filler neck.

2. When attempting to wrongly fuel gasoline into a vehicle with a diesel engine, the fuel nozzle of the filling pump for the gasoline will have a smaller diameter than the "expected" fuel nozzle of the diesel filling pump. The fuel nozzle is now not thick enough and will thus not be able to simultaneously touch both clamping jaws or to even press them apart. Instead, maximally a single clamping jaw is detected so that the locking can then also not be disconnected herewith, even if in this case the free end of the fuel nozzle can be inserted into the area of operation.

An advantageous embodiment of the present invention provides an inclined plane having a laterally protruding edge as the area of the operation, wherein the outlet pipe can slide on the inclined plane. This inclined plane represents a sliding surface for the fuel nozzle, which is inclined at an angle α relative to the longitudinal axis of the pipe section of the filler neck, which protects the upper filling opening against the release of the locking.

The user initially places the fuel nozzle slightly next to the actual filling opening at the top of the sliding surface and then allows for the outlet pipe to slide along the sliding surface. This movement can then drive a mechanism, which causes the unlocking of the closing mechanism. This can occur, as already described above, by pressing apart the clamping jaws, wherein a fuel nozzle, which is too large, cannot be inserted between the raised edge of the inclined plane and would thus slide on the edge, but would thus not come into contact with the clamping jaws.

However, due to this lateral load on the outer jacket surface of the outlet pipe, the fuel nozzle can be subjected to wear, because the fuel nozzle is typically made of aluminum and is thus only slightly wear-resistant.

Another embodiment thus presses the locking elements downward against a return spring. This causes considerably less damage to the material and furthermore allows for the use of springs, which are longer and better guided. Here, a raised edge can also prevent a fuel nozzle, which is too large, from pressing down the locking elements, provided that this should be necessary. A further advantage of the raised edge lies in protecting the locking elements against being pressed open unintentionally, for instance as a result of an accident.

When placing the outlet pipe on the inclined plane, two locking elements, which are arranged opposite one another, are pressed down, for example, then preferably causing a sliding of the outlet pipe on the sliding surface only at that point.

For this purpose, provision is made for a sliding element, which is determined by the locking and which can be unlocked by the described mechanism. The sliding element is mounted next to and above the sliding surface so as to be laterally displaceable. This sliding element is laterally displaced after the locking elements have been depressed of the outlet pipe, wherein the outlet pipe of the fuel nozzle together with the further downward movement is also further pushed to the side through this, until the sliding element completely releases the upper filling opening. Consecutively, the outlet pipe can then be inserted into the pipe section and can depress the lower sealing flap at that location.

Further features of the neck end as claimed in the present invention are high and low pressure valves. Provided that the upper cover is also embodied so as to seal, the lower sealing flap and this upper cover can effect a corresponding pressure compensation upon the occurrence of critical pressures, caused by heat expansion, for instance, or the removal of fuel from the tank at the engine side.

A water channel, which removes water or condensate ingress, can furthermore be arranged above the lower sealing flap, so that the water or condensate ingress does not reach the tank during the next opening of the lower sealing flap.

A further aspect of the present invention, which can also be applied detached from the claimed cap-free filler neck, is the use of a neck end, which can be attached to an already known neck. According to experience, it is difficult to carry out the basic change of the neck during a running vehicle production for commercial-organizational reasons. If, for example, an already constructed system is to be converted to a cap-free fueling during the production, the neck end can be attached to an interface of the neck.

However, the driver is not to be able to remove the neck end by himself. Instead, this should be left to the expert repair shop. To prevent an unauthorized removal, the neck end can thus be provided with a retainer, which can easily be attached to the filler neck, but which can only be detached with the destruction or without destruction by using a special tool. Such a retainer can be formed, for example, by spring elements, which engage in recesses according to the type of a snap ring during or after screwing the neck end onto the conventional end piece of a filler neck and which can only be retracted by a tool, which can be inserted, for example, between the wall of the filler neck and the neck end, wherein the used tool can then contract two ends of the open snap ring and thus overrides the positive contact.

A further feature of the invention, which can also be used independent on the concrete embodiment of the neck end as described above, can be that the neck end and the neck form two separate components, which can be connected with one another via a special connection, so that it is possible to replace the neck end without the filler neck itself. This has the special advantage that, after accommodating a larger amount of mechanical parts, it may be possible that repair may be necessary more often in the region of the neck end and this can be taken care of without replacing the entire neck.

If the neck end, for example, has the above-described locking flaps, these mechanical parts could be damaged. The neck pipe itself is typically a plate or a plastic pipe. A plastic pipe, in particular, is often also fixedly welded with a plastic tank. At any rate, the replacement of the entire filler neck up to the tank is comparatively extensive, because access to this region is difficult and can only be made from the underside of the vehicle. Depending on the vehicle construction, the tank can also be accessible only via the interior with the removal of further parts, so that there is a necessity to be able to repair a neck end in an easier and simpler manner than by replacing the entire filler neck.

For this purpose, the filler neck has a removable connection, similar to the case of the neck end, which can be retrofitted, for standard bayonet or screw closures. The filler neck includes the neck end and the actual neck pipe, which is guided to the tank and which can there be connected with the tank so as to be removable or fixed. The connection between neck end and neck pipe now occurs via a connection, which is designed in such a manner that it can preferably only be detached via a tool. If it is not desired to exclude a possibility for misuse, the connection can also be designed so as to be capable of being disconnected in a simple manner.

A connection, which can be disconnected via a tool, can be formed by resilient locking elements. These locking elements can also be designed here according to the type of a snap ring. The neck end can thus be slid onto the neck pipe, wherein the snap ring can be arranged between the inner wall of the neck end and the outer wall of the neck. An additional seal, for instance in the shape of an O-ring, can provide the required impermeability. The ends of the snap ring can then be pressed together or apart by a tool.

A further possibility lies in that the resilient elements are arranged in the interior of the neck end and that they engage in locking recesses in the inner wall of the neck pipe through recesses in the wall of the neck end. These resilient elements can then be gripped from the inside via the tool and can be retracted inwards so as to be able to detach the neck end. Needless to say, all other conventional twisting tools are also possible.

Finally, it is also possible that the neck end is initially connected with the neck pipe in one piece and in a fixed manner and that a removable neck end is attached only in case repair is necessary after removal, for example by sawing off the defective neck end. For this purpose, the neck pipe can already have corresponding provisions so that a replacement part can be placed according to the above-mentioned principles after removing the available neck end.

A further preferred embodiment of the present invention has an additional protection against leakiness in case of an accident. This protection can also be used independent on the specific embodiment of the neck end, as described above and as claimed in the claims. Only the fact that a double closure via an upper and a lower sealing flap is present is necessary for this.

In case of an accident, there is always the possibility that the neck end is impinged on with an inadmissibly high shearing force, as a result of a deforming edge or an impinging object. In this case, the shearing force is introduced into the neck, which, without special provisions, could break at a location, which cannot be controlled. In particular due to the fact that, on the one hand, the neck geometry is substantially adapted to the shape of the undercarriage and to the position of the neck end, and on the other hand, to the fuel container, a weak spot will not occur anywhere during the course of the neck pipe, as a result of a change of the geometry, which could possibly appear as a break.

To prevent a lower breaking of the neck pipe, as this could possibly lead to a fuel escape, the neck pipe is made of a suitable material, which is break-proof on the one hand and which has a sufficient flexibility on the other hand for withstanding a certain accident-related degree of deformation, while being free from leakage. An even better protection can be achieved in that a predetermined breaking point is arranged between the upper and the lower sealing flap. This predetermined breaking point causes an ultimate moment lead into the wall of the neck end to cause the upper part of the neck end to break, without affecting the lower part of the neck end or even the neck pipe, which is located therebelow. In this case, the lower sealing flap is still available, which sufficiently seals the neck end so as to prevent a fuel escape even with a vehicle, which was involved in an accident.

Preferably, provision can be made for the predetermined breaking point by a depression, which is arranged in the wall of the neck end between the upper and lower sealing flap. Said predetermined breaking point can simply be impressed into the plastic material of the neck end or can already be provided during production. To intensify the effect of the predetermined breaking point, provision can be made for additional material reinforcements above and below the depression.

In the alternative, the neck end can also be embodied so as to include two pieces so that an upper part having the upper sealing flap is inserted into a lower part having the lower sealing flap, wherein the connection assembly is sealed via a seal, for example an O-ring. The upper and the lower part of the neck end then each have a pipe-shaped basic body, being inserted into one another, by inclusion of the O-ring.

Here, the predetermined breaking point can be realized in that the connection assembly can be severed. To prevent this from happening by mistake, the connection assembly is preferably embodied in such a manner that the upper and the lower part of the neck end are inseparably wedged after assembly of the neck end via snap-in pins, wherein the snap-in pins can break in response to an occurrence of the critical breaking force and the upper part can be detached. In this embodiment, the overlap region of the upper and the lower part of the neck can be kept quite small, so as to ensure a safe severing in the region of the predetermined breaking point in response to the appearance of the shearing force.

Additional features and advantages of the invention result from the below description of a preferred exemplary embodiment of the present invention by the drawings.

BRIEF DESCRIPTION OF THE DRAWINGS

FIG. 1 shows a side view in section onto an embodiment of a neck end in accordance with the present invention;

FIG. 2 shows the detail "Z" from FIG. 1;

DESCRIPTION OF THE PREFERRED EMBODIMENT(S) OF THE INVENTION

Figure 3:
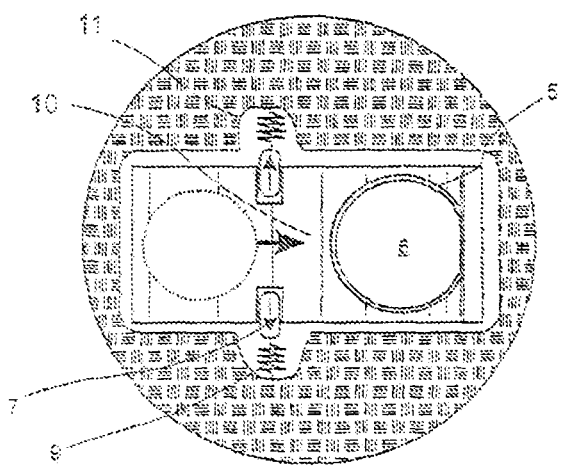
FIG. 3 shows a second embodiment of a neck end in a top view in accordance with the present invention.

FIG. 1 illustrates a side view of an exemplary embodiment of the present invention, which will be described below, without limiting the present invention or the scope of protection of the instant application to this concrete embodiment.

The neck end illustrated in FIG. 1 is formed by a pipe section, the cross section of which initially widens in a conical manner in the direction of the opening. Provision is made below the widened section for the lower sealing flap 2, which seals the neck. For this purpose, the sealing flap is placed against a sealing surface (not illustrated herein) via a spring. Furthermore, the neck end encompasses the high and low pressure valves, which are reflected as detail "Z" in FIG. 2 in an enlarged illustration as well as a water discharge, which is also not illustrated here, via which the water ingress can be drained.

Initially, provision is made in the upper region for the upper filling opening 5, through which the outlet pipe 4 of the fuel nozzle can be inserted into the neck, which then opens the lower sealing flap 2 in response to a further ingress. A closing mechanism 3, which prevents an insertion of the fuel nozzle without opening the closing mechanism 3, is arranged above the upper filling opening 5.

To now minimize or, if possible, prevent improper fueling, the closing mechanism 3 is to be capable of being opened only if the "correct" fuel nozzle, that is the fuel nozzle for filling suitable fuel, is placed.

For this purpose, a ring element 14 is inserted into the upper neck section of the pipe section 1, in which, in turn, a sliding element 30 is guided at right angles to the neck axis in a displaceable manner. The sliding element 30 is U-shaped, wherein it could likewise also be embodied all around as a closed element. Substantial is here only that it has an outlet, through which the outlet pipe 4 can be inserted.

Locking elements 7, which engage in recesses in the sliding element 30 in the upper region in a positive manner, are now depressed by means of the inserted outlet pipe 4. As a result of being depressed, the locking elements 7 now disengage, the sliding element 30 is thus released and can then be displaced in lateral direction.

Below the sliding element 30, an inclined plane is embodied as a sliding surface 10, which is incorporated into the inner jacket surface of the ring element 14. The sliding surface 10 is inclined at an angle α relative to the neck axis of the pipe section 1 and causes a lateral displacement of the outlet pipe 10, which is inserted through the sliding element 30 if it is further inserted into the pipe section 1.

As a result of the lateral displacement, the outlet pipe 4 is now pressed against the sliding element, which, in turn, causes a lateral displacement of the sliding element, until the region above the upper filling opening is completely released for the insertion of the fuel nozzle. However, this unlocking and the subsequent displacement of the sliding element is only possible, if both locking elements 7, which are located opposite one another, are depressed by the lower edge of the fuel nozzle. If the fuel nozzle is not large enough, because the diameter of the outlet pipe 10 is too small, either none or only one locking element 7 can be depressed, which, however, does not override the locking.

The sliding element is embodied in such a manner that it holds the locking elements 7 downwards after the displacement, even if the lower edge of the fuel nozzle is moved laterally towards the right and is no longer arranged above the locking elements 7. In this stage, the left region of the sliding element depresses the locking elements 7.

As an alternative to the two locking elements 7, further locking elements could certainly also be used. It is only important that the unsuitable fuel type is administered via a fuel nozzle, which cannot actuate all of the locking elements 7. The depression of the locking elements 7 has the special advantage that a wear of the fuel nozzle is largely excluded. In particular, lateral grooves cannot be introduced.

In the illustrated preferred embodiment, the locking elements 7 are each formed by a locking pin, which engages in a positive manner into a recess in the upper cover 6. Said locking pin can be relocated downward through the free end of the outlet pipe 4 against the force of a safety spring 9. In so doing, the locking pin "unlatches" out of the recess in the sliding element, which is being used as the upper cover.

In terms of this protection feature, the sliding element has a blocking zone, also known as a locking region, which means nothing more than that it is arranged in closing position with a part of its body above the upper filling opening. The upper filling opening is then released only by the lateral displacement. The inclined sliding surface 10 has, in particular, an inclined position relative to the axis of the pipe section 1 of from 20° to 80°, preferably from 35° to 55° and, as is illustrated here, more preferably of 45°.

Preferably, as is illustrated here, the closing mechanism is protected via a cover cap 11, which has a long hole for inserting the outlet pipe 4, wherein the width of the long hole is slightly larger than the diameter of the outlet pipe 4 and the length of the long hole substantially corresponds to the course of displacement of the sliding element.

Provision is made here above the upper filling opening 5 for an additional closing cap 12, which causes an anti-theft protection and a further seal. For this purpose, the additional closing cap 12 is flexibly arranged on the sliding element and is displaced therewith. At the opposite side, it engages into a locking groove 13, which fixes the additional closing cap 12 in its closed state. After removing the fuel nozzle, a return spring resets the flap 12 so that it can again engage in the locking groove 13 when the sliding element glides back.

In addition, the locking elements can be blocked via the central locking system of the motor vehicle in such a manner that an unlocking is only possible if the central locking system is in the opening position. For this purpose, an electrically driven pin can prevent a movement of the sliding element, as is already the case with the protection of known fuel filler doors, for example.

Finally, the neck end can be designed as an independent component for connection with a known pipe connection or it can naturally also be formed directly into the neck of a tank. If it is an independent component, it can be welded with the pipe section, which is mostly made of plastic, or it can also be connected with the neck via the standard connection/common fastening, which was used for the placement and fastening of a tank cap until now. It is well known in the art that such a standard connection/common fastening would involve a threaded member so that the neck end has a structure so as to be screwed onto the threaded member. This has the special advantage that no change must be made to the neck, if a vehicle is retrofitted to a cap-free fuelling. Preferably, the neck then has a removal protection, which can only be detached by means of a tool, so that the driver himself can no longer manipulate the tank closure.

FIG. 2 reproduces the lower sealing flap 2 in an enlarged illustration. The sealing flap 2 includes a pivot flap, which is arranged on a pivot bearing 15 and which is pressed against a storage edge in the pipe section 1 of the filler neck, including a seal 16 by the force of a closing spring.

In the upper part, the sealing flap 2 has a pressure region, against which the lower edge of the fuel nozzle can support itself. For the purpose of centering the fuel nozzle, provision is made in the center region for a ridge, which protrudes upwards. The pressure region has at least one outlet via which pressures can enter into the interior of the sealing flap 2. The illustrated example has two outlets 17.

In the lower region, the sealing flap 2 is provided with a high pressure bypass 19 and with a low pressure bypass 18, via which low and high pressures, respectively, can be compensated. All types of pressure valves can be used for this purpose, wherein a spring-loaded cam follower is used in the illustrated exemplary embodiment, which supports itself with an upper rim on one side of the bottom of the sealing flap and which is guided through a passage opening in the bottom of the sealing flap with a handle body, while leaving a breathing opening, wherein a spring is clamped between the free end of the handle body and the bottom of the sealing flap. Here, the sealing occurs via the rim, which lifts from the bottom of the sealing flap after overcoming the spring force for the actuation of the respective bypass.

FIG. 3 illustrates a further embodiment of the neck end, which, in place of locking elements 7, which are to be pressed downward, has locking elements 7, which are laterally displaced by the end of the outlet pipe 4 of the fuel nozzle. As in the case of the illustrated exemplary embodiment, this displacement can occur directly by contact with the fuel nozzle, but it is also possible that the fuel nozzle can be inserted into a (non-illustrated) sliding body, which must be pushed downwards together with the end of the outlet pipe 4. This sliding body then has a passage opening, through which the fuel nozzle can be inserted into the neck end once the end position has been reached.

Figure 4:
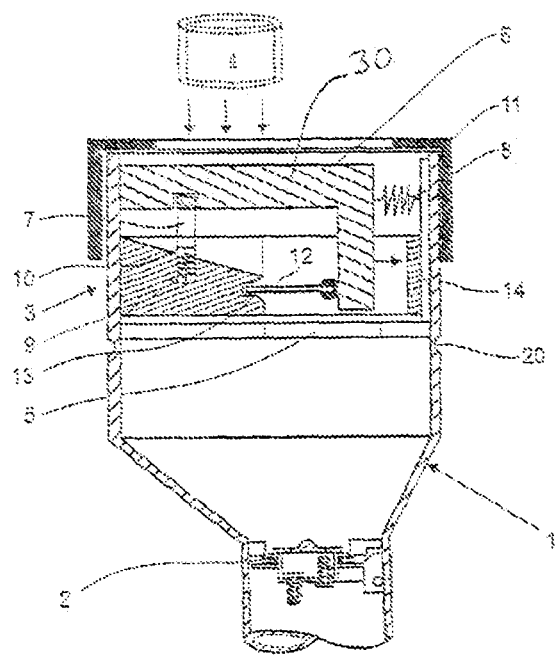
FIG. 4 shows a third embodiment of a neck end having a predetermined breaking point in a side view in section in accordance with the present invention.

FIG. 4 illustrates a neck end including a predetermined breaking point 20, which, in the instant case, is formed by a depression, which is impressed into the neck wall from the outside, thus resulting here in a weakening of the material. The purpose of this predetermined breaking point 20 is that, in the event of an inadmissible shearing force, the upper region of the neck end can break, while maintaining the seal effect of the lower sealing flap 2 and the seal effect of the filler neck thus substantially maintains, in spite of an inadmissibly high shearing force.

Figure 5:
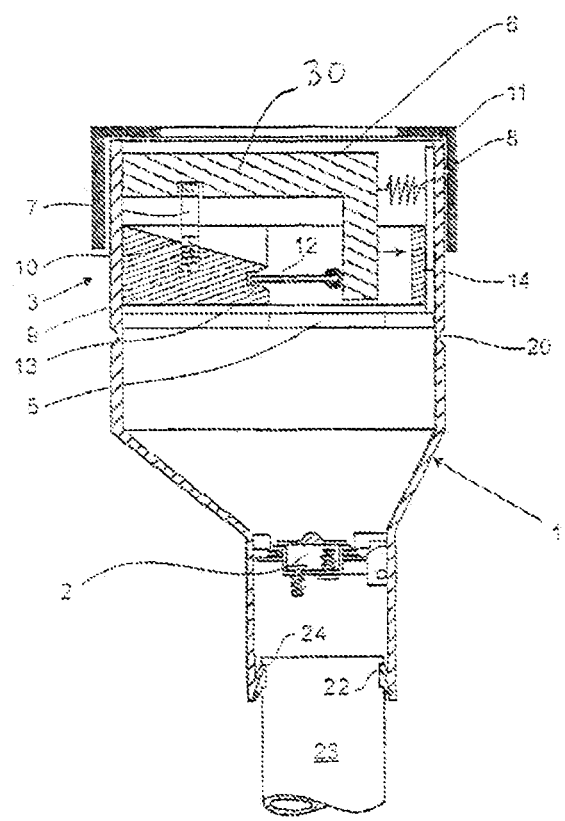
FIG. 5 shows an embodiment of a filler neck including the upper part of a neck pipe and a neck end fastened thereon in accordance with the present invention.

FIG. 5 shows the connection of a neck end having a pipe connection 23 of a tank neck system, which is embodied in two pieces, wherein the neck end, however, can only be detached from the pipe connection 23 with the destruction of the connection element or by means of a tool.

For the connection with the pipe connection 23, the neck end is pushed onto the pipe connection, wherein resilient holding elements 22 engage into recesses of the pipe connection 23 in such a manner that a detaching is only possible with the destruction of the resilient holding edges 24 or by inserting the tool. For the positive connection with the ends, the engaged resilient holding elements 22 engage around holding edges 24 of the pipe connection 23, so that the neck end is held tight. A seal (which is not illustrated here) seals the connection.

Figure 6:
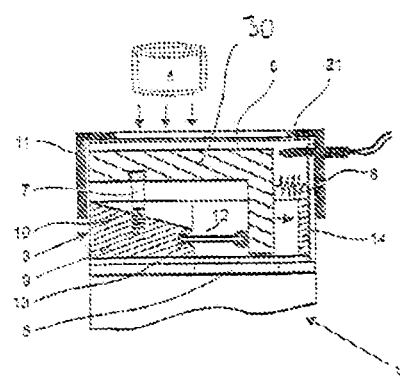
FIG. 6 shows an embodiment of the upper part of a neck end having locking pins for locking via central locking system in accordance with the present invention.

FIG. 6 illustrates a further embodiment of the filler neck, where provision is made for a locking pin 21, which can be actuated via the switching elements of a central locking system of the motor vehicle. This bolt-shaped locking pin 21 incorporates the neck end into the central locking system of the motor vehicle, in that it pushes against the upper cover 6, when in its closed state, so that said upper cover 6 cannot be displaced. As a result, the additional closing cap 12, which forms the upper sealing flap in the illustrated exemplary embodiment, cannot be disengaged from the locking groove 13, the upper sealing flap in the form of the closing cap 12 thus remaining closed, provided that the locking pin 21 remains depressed. The locking pin 21 is retracted only in response to an opening of the central locking system, so that the fueling system is released by means of the central locking system.

The locking pin 21 also permits further additional functions. In the event of a running engine, for example, the vehicle electronics can automatically place the locking pin against the upper cover 6, so that a fueling of the vehicle is only possible if the engine is turned off. The fueling of a vehicle while an external heater, in particular an auxiliary heating system, is turned on is also prevented via the same function. This increases the protection against careless disregard of regulations by the driver.

Furthermore, the function of the locking pin 21 can also be coupled to crash sensors or other elements of the control of the driving dynamics so that the neck end is once again closed in time prior to the vehicle being involved in an accident so that the inherently impossible case that the upper cover 6 is pushed away by a foreign object or by a deforming chassis edge can additionally be prevented.

It goes without saying that the locking pin 21 can also be arranged at any other position of the cap. It is even possible that the locking pin is embodied in a disk-shaped manner and that it can be moved in lateral direction in front of the pipe opening as an additional sealing flap.

The locking of a pivot flap, which is typically provided in a vehicle for covering the tank neck can now become dispensable by the locking pin 21. On the one hand, this enables again the previously conducted design of the chassis having a visible neck end, where, for example the upper cover can be made of stainless steel for creating an interesting optical effect and furthermore saves the displacement of the locking pin 21 against an area of sheet metal of the chassis, which is located relatively far outside, which could possibly be damaged through this, if perhaps the pivot flap is not completely closed and the locking pin 21 is not displaced into the provided opening, but instead pushes against the edge of the opening.

In connection with the predetermined breaking point 20, provision can also be made for the locking pin 21 in the region of the lower sealing flap 2, either as a single locking pin 21 or as an additional locking pin 21. This would have the advantage that the locking will not be overridden by breaking off the upper neck end. This could not be overridden again by breaking off the locked part, particularly if a locking is to take place automatically in connection with the crash sensor system.

It is necessary for the central locking system function of the neck end that provision is made for a locking pin 21 that fixes one of the pivotable sealing flaps regarding to their pivoting movement, or that blocks the movability of the one longitudinally movable functional region of the neck end was blocked, provided that the accessibility into the interior of the pipe connection 23 is provided by the longitudinal movability.

The provision of the predetermined breaking point 20 as well as the complex central locking system and the embodiment of the filler neck as a two-piece component comprising an upper neck end and lower pipe neck, which is connected therewith only with the destruction of the connection is presently considered to be an independent invention complex, which is not required to be in connection with the embodiment of the neck end in the region of the upper and the lower seal. It is thus reserved to direct independent claims to these three complexes.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

List of Reference Numerals 1 pipe section
2 lower sealing flap
3 closing mechanism
4 outlet pipe
5 upper filling opening
6 upper cover
7 locking element
8 closing spring
9 safety spring
10 sliding surface
11 cover cap
12 additional closing flap
13 locking groove
14 holding ring
15 pivot bearing of the sealing flap
16 seal of the sealing flap
17 outlet in the pressure region of the sealing flap
18 low pressure bypass
19 high pressure bypass
20 predetermined breaking point
21 locking pin
22 resilient holding elements
23 pipe connection
24 holding edge
α angle of inclination of the sliding surface relative to the longitudinal axis of the pipe sec

I claim:

1. A cap-free closeable neck for a filler neck of a tank of a motor vehicle, comprising:
a pipe section;
a lower sealing flap arranged in the pipe section;
a closing mechanism arranged above the lower sealing flap, wherein the closing mechanism comprises:
an upper filling opening; and
an upper cover, which in a closed state at least partially covers the upper filling opening and being embodied in such a manner that the upper cover is displaced by inserting an outlet pipe of a fuel nozzle into the upper entry space for releasing the upper filling opening so as to allow for the insertion of the outlet pipe through the upper filling opening and the lower sealing flap and wherein for forming a protection against a filling with unsuitable fuel, the upper cover, in its closed state, is blocked by at least a first locking element and a second locking element and wherein the first locking element and the second locking element are embodied in such a manner that they are unlocked as a function of a type-specific shape of the outlet pine of the fuel nozzle, only when the tank is filled with suitable fuel, whereby the first locking element and the second locking element are formed by blocking devices, which are mounted in such a manner that the blocking devices are displaced by the outlet pipe for unlocking the upper cover out of a blocking position; and
wherein the first locking element and the second locking element are arranged at a distance (a) to one another, wherein the distance (a) is so large that the first locking element and the second locking element are unlocked by the outlet pipe of the fuel nozzle comprising a first diameter, in particular a fuel nozzle for diesel fuel, while at most the first locking element is unlocked by a second fuel nozzle comprising a second diameter, which is smaller relative to the first diameter, and wherein each of the first locking element and the second locking element comprises a locking pin that engages with a recess in the upper cover in a positive manner and which is displaced laterally or downward against a force of a safety spring through a free end of the outlet pipe, wherein, upon completion of displacement of the locking pin, engagement of the locking pin with the recess of the upper cover is overridden.

2. The cap-free closeable neck end for the filler neck of the tank of the motor vehicle according to claim 1, wherein the upper cover is formed by a pivot flap, which is pivoted against a force of a closing spring from a closed state into an open state and wherein the first locking element comprises:
an upper region, which can be displaced by the outlet pipe with a suitable diameter when a free end of the outlet pipe is placed on or slides on the sliding surface for unlocking the outlet pipe with a suitable diameter; and
a lower region, which engages around the pivot flap, which is pivotable inwardly in a direction of the tank in a bolt-like manner, when in closed state, wherein for unlocking engagement is overridden by displacement of the first locking element.

3. The cap-free, closeable neck end for the filler neck of the tank of the motor vehicle according to claim 1, wherein the upper cover comprises a laterally slidable sliding element, which is displaced from an end of the outlet pipe at least in a lateral direction; and
wherein the sliding element at least partially covers the upper filling opening comprising a locking region and wherein the end of the outlet pipe is placed laterally next to the locking region, wherein, when the outlet pipe slides on the sliding surface along a sliding direction the outlet pipe is pushed against the locking region in the sliding direction and displacement of the sliding element is thus effected.

4. The cap-free closeable neck end for the filler neck of the tank of the motor vehicle according to claim 3, wherein the sliding element has a U-shaped inner region comprising two substantially straight legs and a curved center region, wherein the locking region is formed by a part of the center region and wherein the sliding surface is arranged next to the center region and is at least partially covered by the straight legs.

5. The cap-free closeable neck end for the filler neck of the tank of the motor vehicle according to claim 4, wherein the sliding surface is an inclined plane that is inclined at an angle ($\alpha$) relative to an axis of the pipe section that has a value that is selected from the group consisting of 1) between 20° and 80°, 2) between 35° and 55° and 3) 45°.

6. The cap-free closeable neck end for the filler neck of the tank of the motor vehicle according to claim 4, wherein a recess for engaging the first locking element is arranged in the straight legs of the sliding element, wherein the first locking element protrudes inwardly from the recess to such an extent that the first locking element is pressed down only by the outlet pipe having a sufficiently large diameter and that a second outlet pipe comprising a diameter, which is too small, cannot press down the first locking element.

7. The cap-free closeable neck end for the filler neck of the tank of the motor vehicle according to claim 4, wherein a part of the straight legs, which faces away from a center region of the sliding element, is designed in such a manner that, after such a sliding of the outlet pipe in a direction of the upper filling opening, the outlet pipe no longer covers the first locking element, the first locking element being held down by the straight legs on a further displacement path, until the outlet pipe is inserted into the upper filling opening.

8. The cap-free closeable neck end for the filler neck of the tank of the motor vehicle according to claim 7, wherein an inner curvature of the center region of the sliding element substantially corresponds to an outer curvature of the outlet pipe.

9. The cap-free closeable neck end for the filler neck of the tank of the motor vehicle according to claim 1, wherein within the pipe section, above the upper filling opening, a holding ring is inserted, in which the sliding element is guided so as to be slidable.

10. The cap-free closeable neck end for the filler neck of the tank of the motor vehicle according to claim 3, further comprising a cover cap having a long hole for inserting the outlet pipe, wherein a width of the long hole is slightly greater than the diameter of the outlet pipe and a length of the long hole substantially corresponds to a displacement path of the sliding element.

11. The cap-free closeable neck end for the filler neck of the tank of the motor vehicle according to claim 1, further comprising a second sealing flap, wherein the second sealing flap is positioned above the upper filling opening and is pushed open by the outlet pipe against a spring force.

12. The cap-free closeable neck end for the filler neck of the tank of the motor vehicle according to claim 11, wherein the second sealing flap is mounted on a sliding element in a flexible manner and engages with is partial region opposite of a joint into a locking groove in a pipe section, which is stationary relative to the pipe section, when the closing mechanism is in a closed position.

13. The cap-free closeable neck end for the filler neck of the tank of the motor vehicle according to claim 1, wherein the motor vehicle comprises a central locking system, and wherein the first locking element is additionally blocked via the central locking system of the motor vehicle in such a manner that an unlocking is only possible if the central locking system is in an opening position.

14. The cap-free closeable neck end for the filler neck of the tank of the motor vehicle according to claim 1, wherein the pipe section comprises high and/or low pressure valves, via which a high pressure or low pressure in the tank can be equalized by bridging a sealing function o the upper filling opening and/or of the lower sealing flap.

15. The cap-free closeable neck end for the filler neck of the tank of the motor vehicle according to claim 14, wherein the lower sealing flap is mounted so as to be displaceable against a force of a respective valve spring in both directions of an axis of the pipe section, wherein a displacement of the lower sealing flap causes a respective valve function of the high or low pressure valve.

16. The cap-free closeable neck end for the filler neck of the tank of the motor vehicle according to claim 13, further comprising:
   a first bypass that opens in a first direction in response to a first displacement of a first valve body as a result of a high pressure; and
   a second bypass that opens in a second direction in response a second displacement of a second valve body as a result of a low pressure.

17. The cap-free closeable neck end for the filler neck of the tank of the motor vehicle according to claim 1, wherein the cap-free closeable neck comprises a removal protection, which can only be removed by a tool.

18. The cap-free closeable neck end for the filler neck of the tank of the motor vehicle according to claim 17, wherein the removal protection is formed by spring elements, which, engaging around a surface in a resilient manner in response to a placement of the neck end on a tank neck, block the removal, wherein the spring elements are gripped via a gripper and are retracted for deactivating the removal protection.

19. The cap-free closeable neck end for the filler neck of the tank of the motor vehicle according to claim 13, further comprising an upper locking element that is controlled via the central locking system, in particular in the form of a locking pin, which, in a locked state, locks the upper closing element and is switched into an open state via the central locking system, in which the upper locking element is opened by inserting the outlet pipe.

20. The cap-free closeable neck end for the filler neck of the tank of the motor vehicle according to claim 13, further comprising a lower locking element controlled via the central locking system, in particular in the form of a locking pin, which, in a locked state, blocks the lower sealing flap and which is switched into an open state via the central locking system, wherein the lower sealing flap is pivotable by the penetrating outlet pipe.

21. The cap-free closeable neck end for the filler neck of the tank of the motor vehicle according to claim 20, wherein the lower locking element together with the central locking system switches into the open state and the locked state.

22. The cap-free closeable neck end for the filler neck of the tank of the motor vehicle according to claim 21, wherein the central locking system switches the lower locking element into a locked state in response to a running engine or another device, which is not permitted during fueling, and the release of the filler neck only occurs after the engine or the another device has been turned off.

23. The cap-free closeable neck end for the filler neck of the tank of the motor vehicle of claim 20, further comprising a sensor in the form of a crash detector or a driving dynamics and rollover sensor, respectively, wherein, upon identification of a critical situation, the sensor transmits an alarm signal to on-board electronics, which control the central locking system wherein the locking element is closed in response to the occurrence of the alarm signal.

24. The cap-free closeable neck end for the filler neck of the tank of the motor vehicle according to claim 1, comprising:
   a wall for enclosing an inflow region;
   a lower sealing flap;
   an upper cap-free closing mechanism; and
   a lower sealing flap, wherein the wall includes a region with a predetermined breaking point located between the upper cap-free closing mechanism and the lower sealing flap.

25. The cap-free closeable neck end for the filler neck of the tank of the motor vehicle according to claim 24, wherein the region comprises a wall thickness that is thinner than other portions of the wall.

26. The cap-free closeable neck end for the filler neck of the tank of the motor vehicle according to claim 24, wherein the region comprises a revolving groove, which is impressed into the wall.

27. The cap-free closeable neck end for the filler neck of the tank of the motor vehicle according to claim 1, wherein the filler neck of the tank of the motor vehicle comprises:
   a pipe connection, which is connected with the tank; and
   a neck end connected with the pipe connection via a connection, which cannot be detached without being destroyed or without a tool.

28. The cap-free closeable neck end for the filler neck of the tank of the motor vehicle according to claim 27, wherein the connection is formed by resilient holding elements that are arranged between the neck end and the pipe connection, and wherein the resilient holding elements are displaced when the neck end is slid onto the pipe connection and holding edges resiliently engage with accommodations for forming a positive connection in a position of use and being designed in such a manner that the holding edges wedge automatically in response to a stress in the opposite direction.

29. The cap-free closeable neck end for the filler neck of the tank of the motor vehicle according to claim 1, further comprising a sliding surface above the upper filling opening and arranged at an angle ($\alpha$) to a longitudinal axis of the pipe section, along which the outlet pipe, upon being inserted into the pipe section, is guided so as to slide from a starting position, which is laterally offset to the upper filling opening, up to an insertion position, which is congruent with the upper filling opening.

30. The cap-free closeable neck end for the filler neck of the tank of the motor vehicle according to claim 1, wherein the provision is made above the lower sealing flap for a water removal for water or condensate ingress.

31. The cap-free closeable neck end for the filler neck of the tank of the motor vehicle according to claim 1, wherein no tank cap is employed on the neck end.

32. The cap-free closeable neck end for the filler neck of the tank of the motor vehicle according to claim 1, wherein access to the tank is triggered solely by movement of the outlet pipe.

33. The cap-free closeable neck end for the filler neck of the tank of the motor vehicle according to claim 1, wherein the upper cover comprises:
   a pivot flap, which is pivoted against a force of a closing spring from a closed state into an open state; and a laterally slidable sliding element, which is displaced from an end of the outlet pipe at least in a lateral direction, wherein the pivot flap engages said laterally slidable sliding element at the closed state.

34. The cap-free closeable neck end for the filler neck of the tank of the motor vehicle according to claim 33, wherein when the laterally slidable sliding element is displaced from an end of the outlet pipe at least in a lateral direction, the pivot flap no longer engages the laterally slidable sliding element and moves to the open state.

35. The cap-free closeable neck end for the filler neck of the tank of the motor vehicle according to claim 33, wherein the laterally slidable sliding element comprises a slot that receives a portion of the pivot flap.

36. The cap-free closeable neck end for the filler neck of the tank of the motor vehicle according to claim 35, wherein when the laterally slidable sliding element is displaced from an end of the outlet pipe at least in a lateral direction so that the portion of the pivot flap is no longer received in the slot, the pivot flap moves to the open state.

* * * * *